US008588423B2

United States Patent
Pang et al.

(10) Patent No.: US 8,588,423 B2
(45) Date of Patent: Nov. 19, 2013

(54) GROUP/MULTICAST KEY DISTRIBUTION METHOD AND UPDATE METHOD BASED UPON UNICAST SESSION KEY AND BASE STATION

(75) Inventors: Liaojun Pang, Shaanxi (CN); Jun Cao, Shaanxi (CN); Manxia Tie, Shaanxi (CN)

(73) Assignee: China Iwncomm Co., Ltd, Shaanxi (CN)

( * ) Notice: Subject to any disclaimer, the term of this patent is extended or adjusted under 35 U.S.C. 154(b) by 268 days.

(21) Appl. No.: 13/060,126

(22) PCT Filed: Aug. 20, 2009

(86) PCT No.: PCT/CN2009/073368
§ 371 (c)(1),
(2), (4) Date: Mar. 29, 2011

(87) PCT Pub. No.: WO2010/020186
PCT Pub. Date: Feb. 25, 2010

(65) Prior Publication Data
US 2011/0194697 A1    Aug. 11, 2011

(30) Foreign Application Priority Data
Aug. 21, 2008    (CN) .......................... 2008 1 0150694

(51) Int. Cl.
*H04L 9/08*    (2006.01)
(52) U.S. Cl.
USPC ............. 380/279; 380/255; 380/266; 705/71; 713/171
(58) Field of Classification Search
USPC ............. 380/279, 259–266; 705/71; 713/171; 726/1–36
See application file for complete search history.

(56) References Cited

U.S. PATENT DOCUMENTS

| 6,330,671 | B1 | 12/2001 | Aziz | |
|---|---|---|---|---|
| 2005/0117743 | A1* | 6/2005 | Bender et al. | 380/28 |
| 2006/0095935 | A1* | 5/2006 | Ooi et al. | 725/25 |
| 2006/0212399 | A1* | 9/2006 | Akiyama | 705/50 |
| 2006/0256763 | A1* | 11/2006 | Nguyen et al. | 370/338 |
| 2006/0271950 | A1* | 11/2006 | Kim et al. | 725/31 |

(Continued)

FOREIGN PATENT DOCUMENTS

| CN | 1564509 A | 1/2005 |
|---|---|---|
| CN | 1668000 A | 9/2005 |
| CN | 101345765 A | 1/2009 |
| JP | 2003-229844 A | 8/2003 |
| JP | 2007-295511 A | 11/2007 |
| JP | 2008-530919 A | 8/2008 |
| WO | WO-2006085430 A1 | 8/2006 |
| WO | WO-2008034362 A1 | 3/2008 |

OTHER PUBLICATIONS

CN 1668000 A, Sep. 14, 2005, Yirong Chen, Authentication and encryption method for wireless network, pp. 1-13.*
CN 1642073 A, Jul. 20, 2005, Zhenyu et al., Group key consultation and updating method for wireless LAN, pp. 1-11.*
International Search Report for PCT/CN2009/073368 dated Nov. 26, 2009 with English Translation.
Written Opinion of ISA for PCT/CN2009/073368 dated Nov. 18, 2009 with English Translation.

*Primary Examiner* — Haresh N Patel
(74) *Attorney, Agent, or Firm* — Venable LLP; Robert Kinberg

(57) ABSTRACT

A multicast key distribution method, an update method, and a base station based on unicast conversation key, the distribution method includes the following steps: 1) the base station composes groups of multicast key distribution; 2) the base station broadcasts the groups of multicast key distribution to all terminals; 3) the terminals acquire the multicast conversation key through calculation. The present invention solves the problem that the efficiency of the multicast key distribution based on unicast conversation key is low in the prior art, and provides a multicast key distribution method based on unicast conversation key.

18 Claims, 2 Drawing Sheets

(56) References Cited

U.S. PATENT DOCUMENTS

| | | | |
|---|---|---|---|
| 2007/0116282 A1* | 5/2007 | Hawkes et al. | 380/239 |
| 2007/0162981 A1* | 7/2007 | Morioka et al. | 726/30 |
| 2007/0220573 A1* | 9/2007 | Chiussi et al. | 725/114 |
| 2007/0260878 A1* | 11/2007 | Urivskiy et al. | 713/163 |
| 2007/0277200 A1* | 11/2007 | Park | 725/39 |
| 2007/0288997 A1* | 12/2007 | Meier et al. | 726/4 |
| 2008/0069105 A1* | 3/2008 | Costa et al. | 370/392 |
| 2008/0072327 A1* | 3/2008 | Thomlinson et al. | 726/25 |
| 2008/0155605 A1* | 6/2008 | Jeon | 725/47 |
| 2008/0226073 A1* | 9/2008 | Hawkes et al. | 380/270 |
| 2009/0169003 A1* | 7/2009 | Sung | 380/239 |

* cited by examiner

GROUP/MULTICAST KEY DISTRIBUTION METHOD AND UPDATE METHOD BASED UPON UNICAST SESSION KEY AND BASE STATION

This application is a National Stage of PCT Application No. PCT/CN2009/073368, filed on Aug. 20, 2009, designating the United States and claiming priority to Chinese Patent Application No. 200810150694.1, filed with the State Intellectual Property Office of China on Aug. 21, 2008 and entitled "multicast key distribution method and update method based upon unicast session key", contents of which are incorporated herein by reference in their entireties.

FIELD OF THE INVENTION

The present invention relates to a group/multicast key distribution method and update method based upon a unicast session key and a base station.

BACKGROUND OF THE INVENTION

The issue of network security has gained popular attention in both the industry and the academic community. The security issue of a wireless network is far more serious as compared to that of a wired Ethernet. The U.S. Institute for Electrical and Electronics Engineers (IEEE) defined a series of 802.11 and 802.16 standards to enhance the security of wireless local area and wireless metropolitan area networks and to provide a Mobile Terminal (MT) with a secure access to a Base Station (BS). The national standard GB15629.11 of wireless local area network, commonly referred to as the WLAN Authentication and Privacy Infrastructure (WAPI) protocol, was published in China in May, 2003. Both data communication and broadcast communication are incorporated into a Broadband Wireless Multimedia (BWM) network which is a new wireless network architecture for which the issues of secure access and secrete communication shall also be addressed.

For whatever wireless network, two communication modes are typically involved: point-to-point unicast communication and point-to-multipoint group/multicast communication (or referred to as broadcast in a group). Guaranteed authenticity of entities of both communication parties and secrecy of communication contents are required for unicast communication, and also guaranteed legality of group/multicast entities and secrecy of group/multicast messages are required for secure group/multicast communication. Furthermore, a group/multicast receiving terminal is limited to a specific privilege to ensure that only an authorized terminal can read the group/multicast message properly, which requires that firstly the issue of distributing a group/multicast key securely shall be addressed effectively. How to manage the group/multicast key effectively is one of crucial issues to implement secure group/multicast communication.

In the standard of IEEE802.11, security of a Wireless Local Area Network (WLAN) is achieved in a Wired Equivalent Privacy (WEP) protocol with simple management of a key, where a shared key is set manually between a mobile terminal and an access point. In this phase, the IEEE802.11 neither relates to the issue of managing a group/multicast key nor provides a solution for group/multicast security.

Due to serious security defects in the WEP encryption protocol, the IEEE proposed the standard of IEEE802.11i to address the security issue of the WEP. Also the national standard GB15629.11 of the wireless local area network, i.e., WAPI, was proposed in China to overcome some drawbacks of the WEP. The IEEE802.11i and the WAPI are very similar in terms of group/multicast key management despite their different authentication mechanism: a Group/multicast Session Key (GSK) is encrypted with a predefined Unicast Session Key (USK) and distributed. That is, a base station selects a group/multicast session key and encrypts the group/multicast session key with unicast session keys shared with terminals respectively and transmits the encrypted GSKs to the corresponding terminals. Each of the terminals may decrypt the encrypted group/multicast session key with the unicast session key shared with the base station upon reception of a message of the encrypted group/multicast session key to obtain the GSK. The base station may perform secure group/multicast communication after all of the terminals receive the same group/multicast session key. The foregoing process has to be repeated if the group/multicast session key is updated.

A drawback of the above method is inefficiency, and particularly when the group/multicast session key is updated, the base station has to repeat the foregoing process of distributing the group/multicast session key: the base station selects a group/multicast session key, encrypts the GSK with unicast session keys shared with the terminals respectively and transmits the encrypted GSKs to the corresponding terminals.

In the standard of wireless metropolitan area network proposed by the U.S. IEEE, i.e., the standard of IEEE802.16, group/multicast key management learns the IEEE802.11i. However, a new design idea on the issue of secure group/multicast key management was proposed in the standard of IEEE802.16e proposed by the IEEE by introducing a Group/multicast Key Encryption Key (GKEK) to set up a management method with two levels of the Group/multicast Key Encryption Key (GKEK) and the Group/multicast Session Key (GSK). The idea of the method lies in that firstly a base station encrypts the GKEK with unicast session keys setup with terminals respectively and transmits the encrypted GKEKs to the corresponding terminals; the terminals decrypt the encrypted GKEKs with the unicast session keys upon reception of messages; then the base station encrypts the GSK with the GKEK and broadcasts the encrypted GSK to all of the terminals; and the terminals with the GKEK may obtain the same GSK. Thus, a group/multicast session key process has been performed. The same process is performed to update the group/multicast session key, that is, the base station encrypts a GSK with the GKEK being a key and broadcasts the encrypted GSK to all of the terminals.

The group/multicast key management method of the IEEE802.16e also suffers from the following drawbacks: temporal synchronization is used and management of status is complicated; a new key is enabled and disabled dependent upon temporal judgment and it is complex to maintain a synchronous clock in a distributed system.

In view of the above situation, a similar group/multicast session key management method was proposed in China in the fields of wireless metropolitan area network and broadband wireless multimedia.

However this method suffers the following drawbacks.

1. Despite the use of the management method with two levels of a GKEK and a GSK, the GKEK and the GSK are the same for all of the terminals, thus lacking the advantages and characteristics of hierarchical key management.

2. The GKEK is the same for all of the terminals, therefore, it is more likely for any of the terminals to reveal the GKEK to another terminal, thus resulting in low security.

3. No method for updating a GKEK is suggested. Since the GKEK as a basic key is the same for all of the terminals and security thereof is low, the GKEK has to be replaced frequently.

4. No effective method for updating a GKEK is presented, and the GKEK is just encrypted and distributed respectively by the base station to the terminals as in the method for distributing a group/multicast key encryption key.

5. In the foregoing item 4, it may take a long period of time for updating dependent upon the number of terminals, which may cause a phenomenon of interrupted group/multicast communication when the key is updated.

Although the solution proposed in the IEEE802.16e and the solution proposed in China in the fields of wireless metropolitan area network and broadband wireless multimedia may improve the efficient issue of the group/multicast key management to some extent and improve efficiency of distributing and updating a group/multicast session key, these solutions have not address the drawbacks of the IEEE802.11i, the WAPI and the IEEE802.16 thoroughly. That is, at least the Group/multicast Key Encryption Key (GKEK) to be distributed is also encrypted by the base station respectively with the unicast session keys shared with the terminals and transmitted to the corresponding terminals. Moreover, the issue of updating the Group/multicast Key Encryption Key (GKEK) has not been handled but is addressed by simply repeating the initial distribution process.

SUMMARY OF THE INVENTION

The invention provides a group/multicast key distribution method and update method based upon a unicast session key and a base station to address the issue in the prior art of inefficient distribution of a group/multicast key based upon a unicast session key.

A technical solution of the invention is a group/multicast key distribution method based upon a unicast session key, which includes:

constructing, by a base station, a group/multicast key distribution packet; and broadcasting, by the base station, the group/multicast key distribution packet to all of terminals which have passed authentication for security.

Preferably, before the base station constructs the group/multicast key distribution packet, the method further includes: defining, by the base station, system parameters including two p-order cyclic groups of $(G_1, +)$ and $(G_2, \bullet)$ with p being a prime number and Diffie-Hellman calculation issue being a difficult issue in $G_1$, P representing a generator of $G_1$, e representing bilinear transformation on $G_1$ and $G_2$, i.e., $e: G_1 \times G_1 \rightarrow G_2$, and $h(\bullet)$ representing a unidirectional hash function.

Preferably, before the base station constructs the group/multicast key distribution packet, the method further includes:

authenticating, by the base station, each of the terminals and negotiating with the terminal about a unicast key to derive a unicast session key shared between the base station and the terminal.

Preferably, authenticating each of the terminals and negotiating with the terminal about a unicast key is performed:

in WAPI or a standard of 802.11i or through setting a shared key manually.

Preferably, the group/multicast key distribution packet includes:

identity information of the Base Station, BS, a Serial Number, SN, identifying current group/multicast key distribution, group/multicast key data Data and an integrity check key MIC calculated by the base station.

Preferably, in the group/multicast key distribution packet, the Data is calculated by:

selecting, by the base station, randomly a number n−1 (n is larger than or equal to 2) of different elements $v_0, v_1, \ldots, v_{n-2}$ from $Z_q^*$, wherein $v_0, v_1, \ldots, v_{n-2} \in Z_q^*$ and selecting elements $Q_1$ and $Q_2$, wherein $Q_1, Q_2 \in G_1$ and also constructing randomly an (n−1)-order secret polynomial $f(x) \in Z_p[x]$ and performing the following calculation: $Q_K = f(0)P \in G_1$ and $V_i = f(v_i)P (i=0, 1, \ldots n-2)$;

for each of a number m of terminals $MT_i$ which has passed authentication for an access, wherein i=1, 2, ..., m, recording, by the base station, identity information $ID_i$ of the terminal $MT_i$, calculating secrete information $Y_i = h(USK_i)$ by using a unicast session key $USK_i$, calculating $W_i = f(Y_i)(Q_1 + Q_2)$, clearing up $Y_i$, and defining Data1=$(Q_K, Q_1, Q_2, v_0, \ldots, v_{n-2}, V_0, \ldots, V_{n-2}, (ID_1, W_1), \ldots, (ID_m, W_m))$;

selecting, by the base station, a group/multicast session key GSK, wherein GSK$\in G_2$, and further selecting randomly an integer r, wherein $r \in Z_p^*$, and calculating Data2=$(P^*, Q_1^*, U, V_0^*, \ldots, V_{n-2}^*) = (rP, rQ_1, e(Q_K, Q_2)^r GSK, rV_0, \ldots, rV_{n-2})$; and defining Data=(Data 1, Data 2).

Preferably, the method further includes:

obtaining, by each of the terminals, a group/multicast session key by calculating from the received group/multicast key distribution packet.

Preferably, obtaining by the terminal the group/multicast session key by calculating from the received group/multicast key distribution packet includes:

calculating, by the terminal, secret data $Y_x = h(USK_x)$ by using its own unicast session key $USK_x$ resulted from prior negotiation;

constructing, by the terminal, a set by using information of the group/multicast key distribution packet and the calculated $Y_x$:

$$\Gamma = \{e_0, e_1, \ldots e_{n-1}\} = \{v_0, \ldots, v_{n-2}, Y_x\};$$

calculating, by the terminal, secret information $$\sigma_{e_i, \Gamma} = \prod_{e_j \in \Gamma, j \neq i} \frac{e_j}{e_j - e_i}$$

for each $e_i$, wherein $e_i \in \Gamma$, according to the constructed set Yx;

calculating, by the terminal, the Group/multicast Session Key, GSK, according to the secret information as follows:

$$GSK = \frac{e(Q_1^*, Q_K)U}{e\left(Q_1 + Q_2, \sum_{i=0}^{n-2} \sigma_{e_i, \Gamma} V_i^*\right) e(\sigma_{e_{n-1}, \Gamma} W_x, P^*)};$$

and deriving, by the terminal, a group/multicast session integrity check key, GSKI, and a Group/multicast Session Encryption Key, GSKE, from the Group/multicast Session Key, GSK, recalculating an MIC from the GSKI, and upon determining that the group/multicast key distribution packet is valid, determining from a field of SN whether it is a repeated message transmitted from the base station, and if not, obtaining, by the terminal, the group/multicast session key properly.

Preferably, after obtaining the group/multicast session key, the method further includes:

performing, by the base station, directional unicast communication with the terminal or broadcast communication to all of the terminals.

The invention further provides a group/multicast key update method based upon a unicast session key, which includes:

constructing, by a base station, a group/multicast key update packet; and broadcasting, by the base station, the group/multicast key update packet to all of terminals.

Preferably, the group/multicast key update packet includes identity information of the Base Station, BS, a Serial Number, SN, identifying current group/multicast key distribution, group/multicast key data Data calculated by the base station and an integrity check key MIC.

Preferably, in the group/multicast key update packet, the Data is calculated by:

selecting, by the base station, a new group/multicast session key GSK, wherein GSK∈$G_2$, and further selecting randomly an integer r, wherein r∈$Z_p^*$, and calculating Data2= ($P^*$, $Q_1^*$, U, $V_0^*$, ..., $V_{n-2}^*$)=(rP, r$Q_1$, e($Q_K$, $Q_2$)$^r$GSK, r$V_0$, ..., r$V_{n-2}$); and defining Data=(Data 1, Data 2).

Preferably, the method further includes:

obtaining, by each of the terminals, a group/multicast session key by calculating from the received group/multicast key update packet.

Preferably, obtaining by the terminal the group/multicast session key by calculating from the received group/multicast key update packet includes:

calculating, by the terminal, secret data $Y_x$=h(USK$_x$) by using its own unicast session key USK$_x$ resulted from prior negotiation;

constructing, by the terminal, a set by using information of the group/multicast key update packet and the calculated Yx:

$$\Gamma=\{e_0, e_1, \ldots e_{n-1}\}=\{v_0, \ldots, v_{n-2}, Y_x\};$$

calculating, by the terminal, secret information $$\sigma_{e_i, \Gamma} = \prod_{e_j \in \Gamma, j \neq i} \frac{e_j}{e_j - e_i}$$

for each $e_i$, wherein $e_i \in \Gamma$, according to the constructed set Yx;

calculating, by the terminal, the message Group/multicast Session Key, GSK, according to the secrete information as follows:

$$GSK = \frac{e(Q_1^*, Q_K)U}{e\left(Q_1 + Q_2, \sum_{i=0}^{n-2} \sigma_{e_i,\Gamma} V_i^*\right) e(\sigma_{e_{n-1},\Gamma} W_x, P^*)};$$

and deriving, by the terminal, a group/multicast session integrity check key, GSKI, and a Group/multicast Session Encryption Key, GSKE, from the Group/multicast Session Key, GSK, recalculating an MIC from the GSKI, and upon determining that the group/multicast key update packet is valid, determining from a field of SN whether it is a repeated message transmitted from the base station, and if not, obtaining, by the terminal, the group/multicast session key properly.

Preferably, after obtaining the group/multicast session key, the method further includes:

performing, by the base station, directional unicast communication with the terminal or broadcast communication to all of the terminals.

Correspondingly, an embodiment of the invention further provides a base station including:

a construction unit configured to construct a group/multicast key distribution packet or a group/multicast key update packet; and a transmission unit configured to broadcast the group/multicast key distribution packet or the group/multicast key update packet constructed by the construction unit to all of terminals which have passed authentication for security.

Preferably, the base station further includes:

a definition unit configured to define system parameters before the construction unit constructs the group/multicast key distribution packet or the group/multicast key update packet, wherein the system parameters includes: two p-order cyclic groups of ($G_1$, +) and ($G_2$, •) with p being a prime number and Diffie-Hellman calculation issue being a difficult issue in $G_1$; P representing a generator of $G_1$; e representing bilinear transformation on $G_1$ and $G_2$, i.e., e:$G_1 \times G_1 \rightarrow G_2$; and h(•) representing a unidirectional hash function.

Preferably, the base station further includes:

an authentication and negotiation unit configured to authenticate each of the terminals and negotiate with the terminal about a unicast key to derive a unicast session key shared between the base station and the terminal before the construction unit constructs the group/multicast key distribution packet or the group/multicast key update packet.

As may be apparent from the foregoing technical solutions, the invention has the following advantages.

1. It is sufficient to broadcast once to distribute or update a group/multicast session key.

2. Distribution of the group/multicast session key based upon a unicast session key may be integrated seamlessly with a unicast session key negotiation protocol.

3. A broadcast channel is fully used and the communication efficiency of a system is improved.

DETAILED DESCRIPTION OF THE EMBODIMENTS

Terms as referred to in the embodiments of the invention are defined briefly as follows in order to facilitate understanding thereof by those skilled in the art:

BS: base station;

MT$_x$: terminal x;

USK$_x$: unicast session key of the terminal x;

USKI$_x$ and USKE$_x$: unicast session integrity check key and unicast session encryption key derived from the USK$_x$;

Nonce: one-time random number;

GSK: group/multicast session key; and

GSKI and GSKE: group/multicast session integrity check key and group/multicast session encryption key derived from the GSK.

Figure 1:
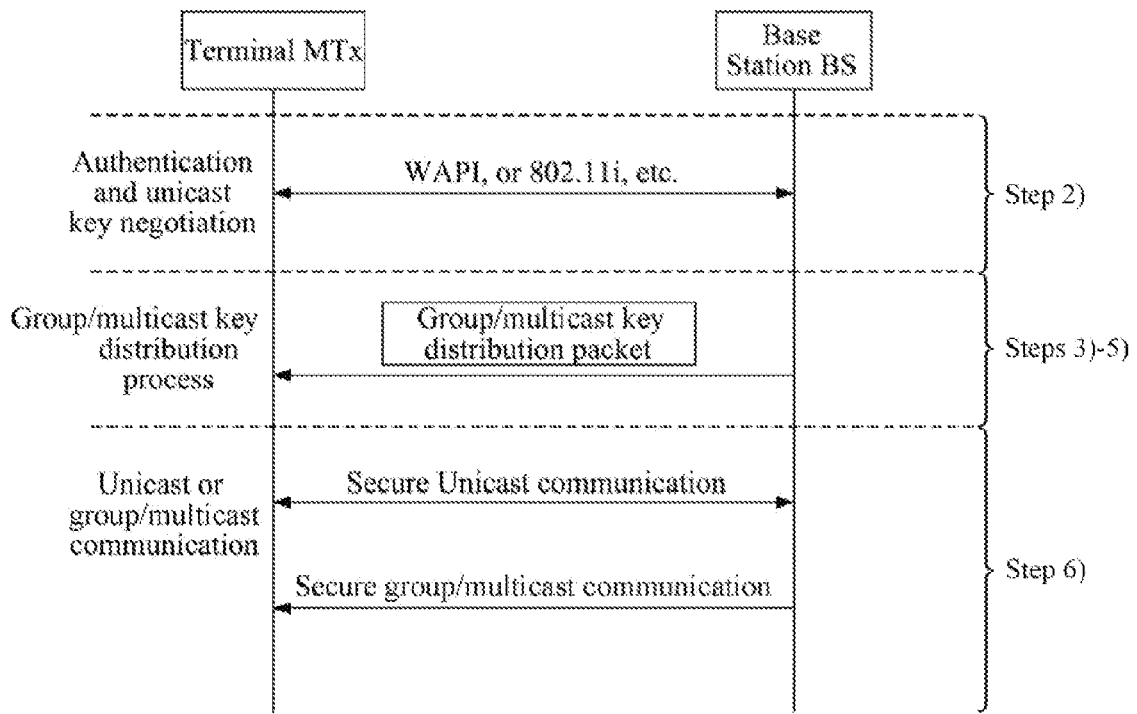
FIG. 1 illustrates a schematic diagram of a group/multicast key distribution method based upon a unicast session key according to an embodiment of the invention.

Referring to FIG. 1 illustrating a flow chart of a group/multicast key distribution method based upon a unicast session key according to an embodiment of the invention, the method includes the following processes.

1) System parameters are defined, and the system parameters includes: two p-order cyclic groups of $(G_1, +)$ and $(G_2, \cdot)$, where p is a prime number, Diffie-Hellman calculation issue is a difficult issue in $G_1$; P representing a generator of $G_1$; e representing bilinear transformation on $G_1$ and $G_2$, i.e., $e:G_1 \times G_1 \to G_2$; and $h(\cdot)$ representing a unidirectional hash function.

The above process 1) is generally performed once and will not be performed after the system parameters are well defined, that is, the process 1) is an optional process.

2) A base station authenticates each of terminals for security and negotiates with the terminal about a Unicast Session Key (USK), and a terminal i shares a Unicast Session Key $USK_i$, from which a unicast session integrity check key and a unicast session encryption key may be derived, with the base station. Any method including those of the WAPI and the 802.11i may be adopted or a method for manually setting a pre-shared key may be used, to perform authentication and unicast key negotiation.

It shall be noted that the above process 2) is required if the base station in the system has neither authenticated each of terminal lines for security nor negotiated with each of the terminal lines about the Unicast Session Key (USK) or may be omitted if the base station in the system has authenticated each of the terminal lines for security and negotiated with each of the terminal lines about the Unicast Session Key (USK).

3) The base station constructs a group/multicast key distribution packet including the following contents: identity information of the Base Station (BS), a Serial Number (SN) identifying current group/multicast key distribution, group/multicast key data (Data) calculated by the base station and an integrity check key MIC, corresponding fields of which are as follows:

Where:
the field of BS: identity information of the base station;
the field of SN: serial number identifying uniquely a current group/multicast key distribution process;
the field of Data: group/multicast key data calculated by the base station; and
the field of MIC: an MIC value calculated on all of the fields preceding this field, here the integrity check key is a group/multicast session integrity check key GSKI derived from a Group/multicast Session Key (GSK) selected by the base station.

The field of Data is calculated as follows.

3.1) The base station selects randomly a number n−1 (n is larger than or equal to 2) of different elements $v_0, v_1, \ldots, v_{n-2}$ from $Z_q^*$, where $v_0, v_1, \ldots, v_{n-2} \in Z_q^*$ and selects elements $Q_1$ and $Q_2$, where $Q_1, Q_2 \in G_1$ and also constructs randomly an (n−1)-order secret polynomial $f(x) \in Z_p[x]$, and subsequently performs the following calculations: $Q_K = f(0)P \in G_1$ and $V_i = f(v_i)P(i=0, 1, \ldots n-2)$.

3.2) For a terminal $MT_i$ which has passed authentication for an access (assuming the number of terminals is m), the base station records device identity information $ID_i$ and calculates secrete information $Y_i = h(USK_i)$ (i=1, 2, ..., m) by using a unicast session key $USK_i$, then calculates $W_i = f(Y_i)(Q_1 + Q_2)$, and subsequently clears up $Y_i$ and defines Data1= $(Q_K, Q_1, Q_2, v_0, \ldots, v_{n-2}, V_0, \ldots, V_{n-2}, (ID_1, W_1), \ldots, (ID_m, W_m))$.

3.3) It is Assumed that the base station selects the group/multicast session key GSK, where $GSK \in G_2$, and the base station further selects randomly an integer r, where $r \in Z_p^*$, and calculates Data2=$(P^*, Q_1^*, U, V_0^*, \ldots, V_{n-2}^*)=(rP, rQ_1, e(Q_K, Q_2)^r GSK, rV_0, \ldots, rV_{n-2})$.

3.4) Finally Data=(Data 1, Data 2) is defined.

4) The base station broadcasts the group/multicast key distribution packet to all of the terminals.

5) The terminals obtain the group/multicast session key by calculating.

Any terminal $MT_x$ decrypts the received group/multicast key distribution packet to obtain the GSK as follows.

5.1) The terminal calculates secret data $Y_x = h(USK_x)$ by using its own unicast session key $USK_x$.

5.2) The terminal constructs a set by using the information of the group/multicast key distribution packet and the calculated Yx:

$$\Gamma = \{e_0, e_1, \ldots e_{n-1}\} = \{v_0, \ldots, v_{n-2}, Y_x\}$$

5.3) The terminal calculates secret information $$\sigma_{e_i, \Gamma} = \prod_{e_j \in \Gamma, j \neq i} \frac{e_j}{e_j - e_i}$$

for each $e_i$, where $e_i \in \Gamma$.

5.4) The Group/multicast Session Key (GSK) is calculated as follows:

$$GSK = \frac{e(Q_1^*, Q_K)U}{e\left(Q_1 + Q_2, \sum_{i=0}^{n-2} \sigma_{e_i, \Gamma} V_i^*\right) e(\sigma_{e_{n-1}, \Gamma} W_x, P^*)}$$

5.5) The group/multicast session integrity check key GSKI and a group/multicast session encryption key GSKE are derived from the Group/multicast Session Key (GSK), the MIC is recalculated from the GSKI, it is determined whether the packet is valid, and if the packet is invalid, the packet is discarded directly, otherwise, it is determined from the field of SN whether it is a repeated message transmitted from the base station, and if so, the repeated message is discarded directly, otherwise, the terminal obtains the group/multicast session key properly.

6) Unicast or group/multicast communication: the base station may perform bidirectional unicast communication with the terminal or broadcast communication to all of the terminals after the foregoing processes are performed. Security of unicast communication is guaranteed by the unicast session integrity check key and the unicast session encryption key derived from the $USK_x$, and security of group/multicast communication is guaranteed by the group/multicast session integrity check key and the group/multicast session encryption key derived from the GSK.

It shall be noted that the above solution also supports updating of a group/multicast session key in the same method as for distribution of a group/multicast session key. In order to improve the efficiency of calculation, however, when the field of Data is calculated, calculations in only the processes 3 and 4 are performed in a key update process while omitting the processes 1 and 2. Moreover, when a new terminal has passed authentication with the base station and no group/multicast session key is updated, the base station performs the process 2 of calculating the field of Data only for the newly accessed terminal when the group/multicast session key is distributed to the newly accessed terminal, thereby improving the efficiency of calculation.

Figure 2:
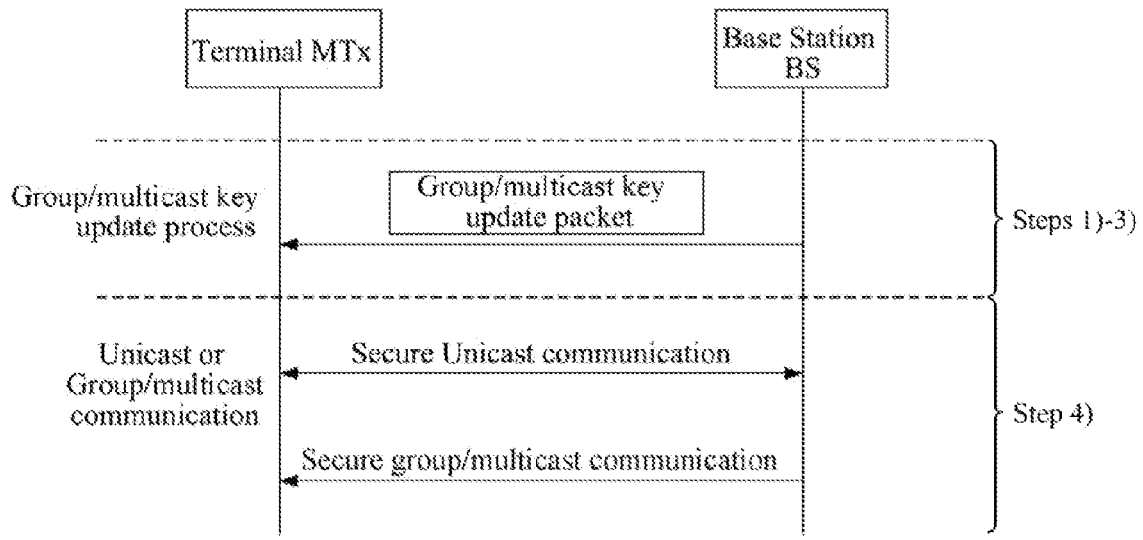
FIG. 2 illustrates a schematic diagram of a group/multicast key update method based upon a unicast session key according to an embodiment of the invention.

Referring to FIG. 2 illustrating a flow chart of a group/multicast key update method based upon a unicast session key according to an embodiment of the invention, the method includes the following processes.

1) A base station constructs a group/multicast key update packet.

The packet includes the following contents.

| BS | SN | Data | MIC |

Where:

the field of BS: identity information of the base station;

the field of SN: serial number identifying uniquely a current group/multicast key update process;

the field of Data: group/multicast key data calculated by the base station; and the field of MIC: an MIC value calculated on all of the fields preceding this field, here the integrity check key is a group/multicast session integrity check key GSKI derived from a Group/multicast Session Key (GSK) selected by the base station.

The field of Data is calculated as follows.

1.1) It is assumed that the base station selects a new group/multicast session key GSK, where GSK∈$G_2$, and the base station further selects randomly an integer r, where r∈$Z_p^*$, and calculates Data $2=(P^*, Q_1^*, U, V_0^*, \ldots, V_{n-2}^*)=(rP, rQ_1, e(Q_K, Q_2)^r GSK, rV_0, \ldots, rV_{n-2})$;

1.2) Finally Data=(Data 1, Data 2) is defined.

2) The base station broadcasts the group/multicast key update packet to all of the terminals.

3) The terminals obtain the group/multicast session key by calculating.

Any terminal $MT_x$ decrypts the received group/multicast key update packet to obtain the GSK as follows.

3.1) The terminal calculates secret data $Y_x=h(USK_x)$ by using its own unicast session key $USK_x$.

3.2) The terminal constructs a set by using the information of the group/multicast key update packet and the calculated Yx:

$$\Gamma=\{e_0, e_1, \ldots e_{n-1}\}=\{v_0, \ldots, v_{n-2}, Y_x\};$$

3.3) The terminal calculates secret information $$\sigma_{e_i,\Gamma} = \prod_{e_j \in \Gamma, j \neq i} \frac{e_j}{e_j - e_i}$$

for each $e_i$, where $e_i \in \Gamma$.

3.4) The Group/multicast Session Key (GSK) is calculated as follows:

$$GSK = \frac{e(Q_1^*, Q_K)U}{e\left(Q_1 + Q_2, \sum_{i=0}^{n-2} \sigma_{e_i,\Gamma} V_i^*\right) e(\sigma_{e_{n-1},\Gamma} W_x, P^*)};$$

3.5) The group/multicast session integrity check key GSKI and a group/multicast session encryption key GSKE are derived from the Group/multicast Session Key (GSK), the MIC is recalculated from the GSKI, it is determined whether the packet is valid, and if the packet is invalid, the packet is discarded directly, otherwise, it is determined from the field of SN whether it is a repeated message transmitted from the base station, and if so, the repeated message is discarded directly, otherwise, the terminal obtains the group/multicast session key properly.

4) Unicast or group/multicast communication: the base station may perform bidirectional unicast communication with the terminal or broadcast communication to all of the terminals after the foregoing processes are performed. Security of unicast communication is guaranteed by the unicast session integrity check key and the unicast session encryption key derived from the $USK_x$, and security of group/multicast communication is guaranteed by the group/multicast session integrity check key and the group/multicast session encryption key derived from the GSK.

A method for distributing a group/multicast key to a newly accessed terminal based upon a unicast session key according to an embodiment of the invention includes the following processes.

1) A base station authenticates the terminal $MT_i$ for security and negotiates with the terminal about a Unicast Session Key $USK_i$ from which a unicast session integrity check key and a unicast session encryption key may be derived. Any method including those of the WAPI and the 802.11i may be adopted or a method for manually setting a pre-shared key may be used to perform authentication and unicast key negotiation.

It shall be noted that the above process 1) is required if the base station has neither authenticated the terminal $MT_i$ for security nor negotiated with the terminal about the Unicast Session Key (USK) or may be omitted if the base station in the system has authenticated each of the terminal lines for security and negotiated with each of the terminal lines about the Unicast Session Key (USK).

2) The base station constructs a group/multicast key distribution packet.

The packet includes the following contents.

| BS | SN | Data | MIC |

Where:

the field of BS: identity information of the base station;

the field of SN: serial number identifying uniquely a current group/multicast key distribution process and being the same as the field of SN selected by the base station for current group/multicast key distribution;

the field of Data: group/multicast key data calculated by the base station; and the field of MIC: an MIC value calculated on all of the fields preceding this field, here the integrity check key is a group/multicast session integrity check key GSKI derived from a Group/multicast Session Key (GSK) selected by the base station.

The field of Data is calculated as follows.

2.1) For the terminal $MT_i$, the base station records device identity information $ID_i$ and calculates secrete information $Y_i=h(USK_i)(i=1, 2, \ldots, m)$ by using the unicast session key $USK_i$, then calculates $W_i=f(Y_i)(Q_1+Q_2)$, and subsequently clears up $Y_i$ and defines Data1=($Q_K$, $Q_1$, $Q_2$, $v_0, \ldots, v_{n-2}, V_0, \ldots, V_{n-2}, (ID_i, W_i)$);

2.2) Data=(Data 1, Data 2) is calculated by using the data Data2 currently calculated by the base station.

3) The base station broadcasts the group/multicast key distribution packet to the terminal $MT_i$;

4) The terminal $MT_i$ obtains the group/multicast session key by calculating.

4.1) The terminal calculates secret data $Y_i=h(USK_i)$ by using its own unicast session key $USK_i$.

4.2) The terminal constructs a set by using the information of the group/multicast key distribution packet and the calculated Yi:

$$\Gamma=\{e_0, e_1, \ldots e_{n-1}\} = \{v_0, \ldots, v_{n-2}, Y_i\}$$

4.3) The terminal calculates secret information $$\sigma_{e_i,\Gamma} = \prod_{e_j \in \Gamma, j \ne i} \frac{e_j}{e_j - e_i}$$

for each $e_i$, where $e_i \in \Gamma$.

4.4) The Group/multicast Session Key (GSK) is calculated as follows:

$$GSK = \frac{e(Q_1^*, Q_K)U}{e\left(Q_1 + Q_2, \sum_{i=0}^{n-2} \sigma_{e_i,\Gamma} V_i^*\right) e(\sigma_{e_{n-1},\Gamma} W_x, P^*)}$$

4.5) The group/multicast session integrity check key GSKI and a group/multicast session encryption key GSKE are derived from the Group/multicast Session Key (GSK), the MIC is recalculated from the GSKI, it is determined whether the packet is valid, and if the packet is invalid, the packet is discarded directly, otherwise, it is determined from the field of SN whether it is a repeated message transmitted from the base station, and if so, the repeated message is discarded directly, otherwise, the terminal obtains the group/multicast session key properly.

5) Unicast or group/multicast communication: the base station may perform bidirectional unicast communication with the terminal or broadcast communication to all of the terminals after the foregoing processes are performed. Security of unicast communication is guaranteed by the unicast session integrity check key and the unicast session encryption key derived from the $USK_i$, and security of group/multicast communication is guaranteed by the group/multicast session integrity check key and the group/multicast session encryption key derived from the GSK.

Figure 3:
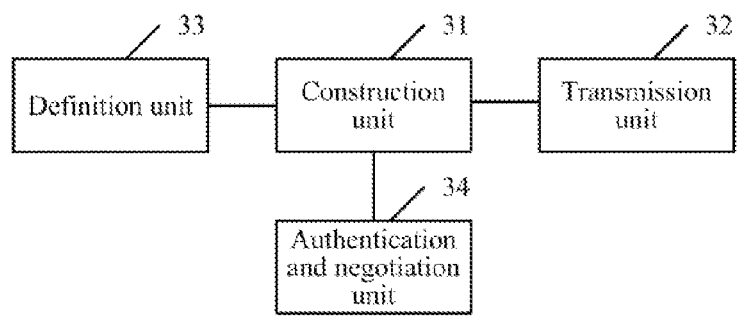
FIG. 3 illustrates a schematic structure diagram of a base station according to an embodiment of the invention.

Based upon the foregoing methods, an embodiment of the invention provides a base station. FIG. 3 illustrates a schematic structure diagram of the base station according to the embodiment of the invention. As illustrated in FIG. 3, the base station includes a construction unit 31 and a transmission unit 32, where the construction unit 31 is configured to construct a group/multicast key distribution packet or a group/multicast key update packet, and the transmission unit 32 is configured to broadcast the group/multicast key distribution packet or the group/multicast key update packet constructed by the construction unit 31 to all of terminals which have passed authentication for security.

Preferably, the base station further includes a definition unit 33 configured to define system parameters before the construction unit 31 constructs the group/multicast key distribution packet or the group/multicast key update packet, where the system parameters includes: two p-order cyclic groups of $(G_1, +)$ and $(G_2, \bullet)$ with p being a prime number and Diffie-Hellman calculation issue being a difficult issue in $G_1$; P representing a generator of $G_1$; e representing bilinear transformation on $G_1$ and $G_2$, i.e., $e:G_1 \times G_1 \rightarrow G_2$; and $h(\bullet)$ representing a unidirectional hash function.

Preferably, the base station further includes an authentication and negotiation unit 34.

The authentication and negotiation unit 34 is configured to authenticate each of the terminals and negotiate with the terminal about a unicast key to derive a unicast session key shared between the base station and the terminal before the construction unit 31 constructs the group/multicast key distribution packet or the group/multicast key update packet.

For details of implementing functions and roles of the units in the base station, reference may be made to the corresponding implementations in the foregoing methods, and a detailed description thereof is omitted here.

As may be apparent from the foregoing embodiments, a group/multicast key distribution packet is constructed and broadcasted to all of terminals which have passed authentication for security so that the terminals obtain a group/multicast session key by calculating on the group/multicast key distribution packet upon reception of the group/multicast key distribution packet. Apparently in the invention, it is sufficient to broadcast once to distribute or update a group/multicast session key between a base station and terminals; distribution of the group/multicast session key based upon a unicast session key may be integrated seamlessly with a unicast session key negotiation protocol; and the invention makes full use of a broadcast channel and improves the communication efficiency of a system.

Those skilled in the art may clearly appreciated from the foregoing description of the embodiments that the invention may be embodied in the form of software plus a requisite general hardware platform or in hardware, but the former is a preferred embodiment in many cases. Based upon such understanding, the technical solution of the invention essentially or a part thereof contributing to the prior art may be embodied in the form of a software product which may be stored in a storage medium, e.g., an ROM/RAM, a magnetic disk, an optical disk. and which may include several instructions to cause a computer device (e.g., a personal computer, a server, or a network device) to perform the methods described in the embodiments of the invention or some parts thereof.

The foregoing description is merely illustrative of the preferred embodiments of the invention, and it shall be pointed out that those ordinarily skilled in the art may further make several modifications and variations without departing from the principle of the invention and that these modifications and variations shall also be considered as coming into the scope of the invention.

The invention claimed is:

1. A group/multicast key distribution method based upon a unicast session key, comprising:

constructing, by a base station, a group/multicast key distribution packet; and broadcasting, by the base station, the group/multicast key distribution packet to all of terminals which have passed authentication for security, wherein the distribution method further comprise: before the base station constructs the group/multicast key distribution packet, defining, by the base station, system parameters including two p-order cyclic groups of $(G_1, +)$ and $(G_2, \bullet)$ with p being a prime number and Diffie-Hellman calculation issue being a difficult issue in $G_1$, P representing a generator of $G_1$, e representing bilinear transformation on $G_1$ and $G_2$, i.e., $e:G_1 \times G_1 \rightarrow G_2$, and $h(\bullet)$ representing a unidirectional hash function.

2. The group/multicast key distribution method based upon a unicast session key of claim 1, further comprising: before the base station constructs the group/multicast key distribution packet,
   authenticating, by the base station, each of the terminals and negotiating with the terminal about a unicast key to derive a unicast session key shared between the base station and the terminal.

3. The group/multicast key distribution method based upon a unicast session key of claim 2, wherein authenticating each of the terminals and negotiating with the terminal about a unicast key is performed:
   in WAPI or a standard of 802.11i or through setting a shared key manually.

4. The group/multicast key distribution method based upon a unicast session key of claim 2, wherein the group/multicast key distribution packet comprises:
   identity information of the Base Station, BS, a Serial Number, SN, identifying current group/multicast key distribution, group/multicast key data Data calculated by the base station and an integrity check key MIC,
   wherein after receiving the group/multicast key distribution packet, the terminal uses the SN to determine whether the received group/multicast key distribution packet is a repeated message transmitted from the base station.

5. The group/multicast key distribution method based upon a unicast session key of claim 4, wherein in the group/multicast key distribution packet, the Data is calculated by:
   selecting, by the base station, randomly a number n−1 (n is larger than or equal to 2) of different elements $v_0, v_1, \ldots, v_{n-2}$ from $Z_q^*$, wherein $v_0, v_1, \ldots, v_{n-2} \in Z_q^*$ and selecting elements $Q_1$ and $Q_2$, wherein $Q_1, Q_2 \in G_1$ and also constructing randomly an (n−1)-order secret polynomial $f(x) \in Z_p[x]$ and performing the following calculation: $Q_K = f(0)P \in G_1$ and $V_i = f(v_i)P(i=0, 1, \ldots n-2)$;
   for each of a number m of terminals $MT_i$ which has passed authentication for an access, wherein $i=1, 2, \ldots, m$, recording, by the base station, identity information $ID_i$ of the terminal $MT_i$, calculating secrete information $Y_i = h(USK_i)$ by using a unicast session key $USK_i$, calculating $W_i = f(Y_i)(Q_i + Q_2)$, clearing up $Y_i$, and defining $Data1 = (Q_K, Q_1, Q_2, v_0, \ldots, v_{n-2}, V_0, \ldots, V_{n-2}, (ID_1, W_1), \ldots, (ID_m, W_m))$;
   selecting, by the base station, a group/multicast session key GSK, wherein $GSK \in G_2$, and further selecting randomly an integer r, wherein $r \in Z_p^*$, and calculating $Data2 = (P^*, Q_1^*, U, V_0^*, \ldots, V_{n-2}^*) = (rP, rQ_1, e(Q_K, Q_2)^r GSK, rV_0, \ldots, rV_{n-2})$; and
   defining Data=(Data 1, Data 2).

6. The group/multicast key distribution method based upon a unicast session key of claim 1, further comprising:
   obtaining, by each of the terminals, a group/multicast session key by calculating from the received group/multicast key distribution packet.

7. The group/multicast key distribution method based upon a unicast session key of claim 6, wherein obtaining by the terminal the group/multicast session key by calculating from the received group/multicast key distribution packet comprises:
   calculating, by the terminal, secret data $Y_x = h(USK_x)$ by using its own unicast session key $USK_x$ resulted from prior negotiation;
   constructing, by the terminal, a following set by using information of the group/multicast key distribution packet and the calculated Yx:

$\Gamma = \{e_0, e_1, \ldots e_{n-1}\} = \{v_0, \ldots, v_{n-2}, Y_x\};$ calculating, by the terminal, secret information $$\sigma_{e_i, \Gamma} = \prod_{e_j \in \Gamma, j \neq i} \frac{e_j}{e_j - e_i}$$

for each $e_i$, wherein $e_i \in \Gamma$, according to the constructed set Yx;
   calculating, by the terminal, the Group/multicast Session Key, GSK, according to the secrete information as follows:

$$GSK = \frac{e(Q_1^*, Q_K)U}{e\left(Q_1 + Q_2, \sum_{i=0}^{n-2} \sigma_{e_i, \Gamma} V_i^*\right) e(\sigma_{e_{n-1}, \Gamma} W_x, P^*)};$$

and
   deriving, by the terminal, a group/multicast session integrity check key, GSKI, and a Group/multicast Session Encryption Key, GSKE, from the Group/multicast Session Key, GSK, recalculating an MIC from the GSKI, and upon determining that the group/multicast key distribution packet is valid, determining from a field of SN whether it is a repeated message transmitted from the base station, and if not, obtaining, by the terminal, the group/multicast session key properly.

8. The group/multicast key distribution method based upon a unicast session key of claim 7, further comprising: after obtaining the group/multicast session key,
   performing, by the base station, directional unicast communication with the terminal or broadcast communication to all of the terminals.

9. A group/multicast key update method based upon a unicast session key, comprising:
   constructing, by a base station, a group/multicast key update packet; and
   broadcasting, by the base station, the group/multicast key update packet to all of terminals,
   wherein the update method further comprise: before the base station constructs the group/multicast key update packet, defining, by the base station, system parameters including two p-order cyclic groups of $(G_1, +)$ and $(G_2, \cdot)$ with p being a prime number and Diffie-Hellman calculation issue being a difficult issue in $G_1$, P representing a generator of $G_1$, e representing bilinear transformation on $G_1$ and $G_2$, i.e., $e: G_1 \times G_1 \rightarrow G_2$, and $h(\cdot)$ representing a unidirectional hash function.

10. The group/multicast key update method based upon a unicast session key of claim 9, further comprising: before the base station constructs the group/multicast key update packet,
   authenticating, by the base station, each of the terminals and negotiating with the terminal about a unicast key to derive a unicast session key shared between the base station and the terminal.

11. The group/multicast key update method based upon a unicast session key of claim 9, wherein the group/multicast key update packet comprises identity information of the Base Station, BS, a Serial Number, SN, identifying current group/multicast key distribution, group/multicast key data Data calculated by the base station and an integrity check key MIC, wherein after receiving the group/multicast key update packet, the terminal uses the SN to determine whether the received group/multicast key update packet is a repeated message transmitted from the base station.

12. The group/multicast key update method based upon a unicast session key of claim 11, wherein in the group/multicast key update packet, the Data is calculated by:
   selecting, by the base station, a new group/multicast session key GSK, wherein GSK$\in G_2$ and further selecting randomly an integer r, wherein r$\in Z_p^*$, and calculating Data2=(P*, $Q_1^*$, U, $V_0^*$, ..., $V_{n-2}^*$)=(rP, $rQ_1$, e($Q_K$, $Q_2$)$^r$GSK, $rV_0$, ..., $rV_{n-2}$); and
   defining Data=(Data 1, Data 2).

13. The group/multicast key update method based upon a unicast session key of claim 9, further comprising:
   obtaining, by each of the terminals, a group/multicast session key by calculating from the received group/multicast key update packet.

14. The group/multicast key update method based upon a unicast session key of claim 13, wherein obtaining by the terminal the group/multicast session key by calculating from the received group/multicast key update packet comprises:
   calculating, by the terminal, secret data $Y_x$=h($USK_x$) by using its own unicast session key $USK_x$ resulted from prior negotiation;
   constructing, by the terminal, a set by using information of the group/multicast key update packet and the calculated Yx:

$$\Gamma = \{e_0, e_1, \ldots, e_{n-1}\} = \{v_0, \ldots, v_{n-2}, Y_x\};$$

$$\sigma_{e_i,\Gamma} = \prod_{e_j \in \Gamma, j \neq i} \frac{e_j}{e_j - e_i}$$

calculating, by the terminal, secret information for each $e_i$, wherein $e_i \in \Gamma$, according to the constructed set Yx;
   calculating, by the terminal, the Group/multicast Session Key, GSK, according to the secrete information as follows:

$$GSK = \frac{e(Q_1^*, Q_K)U}{e\left(Q_1 + Q_2, \sum_{i=0}^{n-2} \sigma_{e_i,\Gamma} V_i^*\right) e(\sigma_{e_{n-1},\Gamma} W_x, P^*)};$$

and
   deriving, by the terminal, a group/multicast session integrity check key, GSKI, and a Group/multicast Session Encryption Key, GSKE, from the Group/multicast Session Key, GSK, recalculating an MIC from the GSKI, and upon determining that the group/multicast key update packet is valid, determining from a field of SN whether it is a repeated message transmitted from the base station, and if not, obtaining, by the terminal, the group/multicast session key properly.

15. The group/multicast key update method based upon a unicast session key of claim 14, further comprising: after obtaining the group/multicast session key,
   performing, by the base station, directional unicast communication with the terminal or broadcast communication to all of the terminals.

16. A base station, comprising:
   a construction unit to construct a group/multicast key distribution packet or a group/multicast key update packet; and
   a transmission unit to broadcast the group/multicast key distribution packet or the group/multicast key update packet constructed by the construction unit to all of terminals which have passed authentication for security, wherein the transmission unit comprises a transmitter to transmit messages;
   wherein the base station further comprises:
   a definition unit to define system parameters before the construction unit constructs the group/multicast key distribution packet or the group/multicast key update packet, wherein the system parameters includes: two p-order cyclic groups of ($G_1$, +) and ($G_2$, •) with p being a prime number and Diffie-Hellman calculation issue being a difficult issue in $G_1$; P representing a generator of $G_1$; e representing bilinear transformation on $G_1$ and $G_2$, i.e., e:$G_1$ and h(•) representing a unidirectional hash function.

17. The base station of claim 16, further comprising:
   an authentication and negotiation unit to authenticate each of the terminals and negotiate with the terminal about a unicast key to derive a unicast session key shared between the base station and the terminal before the construction unit constructs the group/multicast key distribution packet or the group/multicast key update packet.

18. The base station of claim 16, wherein group/multicast key distribution packet or the group/multicast key update packet comprises identity information of the Base Station, BS, a Serial Number, SN, identifying current group/multicast key distribution, group/multicast key data Data calculated by the base station and an integrity check key MIC;
   wherein after receiving the group/multicast key distribution packet or the group/multicast key update packet, the terminal uses the SN to determine whether the received group/multicast key distribution packet is a repeated message transmitted from the base station.

* * * * *